(12) United States Patent
Kugel et al.

(10) Patent No.: US 9,313,132 B1
(45) Date of Patent: Apr. 12, 2016

(54) STANDALONE OAM ACCELERATION ENGINE

(71) Applicant: Altera Corporation, San Jose, CA (US)

(72) Inventors: Alexander Kugel, High Wycombe (GB); Mark Jonathan Lewis, Marlow Bottom (GB)

(73) Assignee: Altera Corporation, San Jose, CA (US)

( * ) Notice: Subject to any disclaimer, the term of this patent is extended or adjusted under 35 U.S.C. 154(b) by 38 days.

(21) Appl. No.: 14/289,178

(22) Filed: May 28, 2014

(51) Int. Cl.
*H04L 12/801* (2013.01)
*H04L 12/26* (2006.01)

(52) U.S. Cl.
CPC ............... *H04L 47/10* (2013.01); *H04L 43/04* (2013.01)

(58) Field of Classification Search
CPC .................................. H04L 47/10; H04L 43/04
See application file for complete search history.

(56) References Cited

U.S. PATENT DOCUMENTS

| | | | | |
|---|---|---|---|---|
| 7,881,221 B2* | 2/2011 | Arad | ......................... | H04L 1/24 370/252 |
| 8,830,841 B1* | 9/2014 | Mizrahi | .................. | G11C 15/00 370/230.1 |
| 2004/0208120 A1* | 10/2004 | Shenoi | .............. | H04L 29/06027 370/229 |
| 2014/0071831 A1* | 3/2014 | Sinha | .................. | H04L 41/0213 370/241.1 |

* cited by examiner

*Primary Examiner* — Mohammad Anwar
(74) *Attorney, Agent, or Firm* — Fletcher Yoder, P.C.

(57) ABSTRACT

Systems and methods are provided herein for implementing an OAM co-processor that is connected to a switching device. The ingress engine may determine whether the received input data comprises OAM information, and the ingress engine may selectively process or forward the input data to the switching device. If the ingress engine determines that the input data does comprise OAM information, the ingress engine may intercept the input data and process it at the OAM co-processor. This may cause OAM information to be processed utilizing the latest known OAM technology, rather than the potentially dated OAM processing technology of the switching device.

15 Claims, 6 Drawing Sheets

STANDALONE OAM ACCELERATION ENGINE

BACKGROUND OF THE INVENTION

Operation, Management, and Administration (OAM) processing is typically implemented by switching and routing devices which allow limited reprogrammability by consumers of those devices. Because OAM standards are rapidly evolving, proprietary switches and routers generally lag behind cutting-edge OAM capabilities. For example, processing capabilities of switching or routing devices may be cutting-edge for a small fraction of the usable life span of a device as new OAM technology emerges. It may be impossible to implement evolving technology in existing routing and switching devices because of closed or unmodifiable architectures without replacing the devices. Furthermore, routing and switching devices generally do not provide differentiating features for OAM and face scalability challenges. Additionally, the OAM functionality of routing and switching devices may not be scalable to support a high number of OAM entities.

SUMMARY

Systems and methods are provided herein for implementing an Operation, Administration, and Management (OAM) co-processor that is connected to a switching or routing device (hereafter, where "switching device" or "routing device" is used, any known switching device, routing device, ASSP, NPU, line card, or any other device that causes data to be transmitted or forwarded are contemplated) in accordance with embodiments of the present disclosure. An OAM co-processor may be implemented on, e.g., an integrated circuit (IC) device, such as a programmable logic device (PLD) (e.g., a field programmable gate array (FPGA)), etc. In some embodiments, an ingress engine (e.g., of an OAM co-processor) may receive and process input data. For example, the ingress engine may receive Multi Protocol Label Switching (MPLS) or Ethernet data packets. The ingress engine may determine whether the received input data comprises OAM information, and the ingress engine may selectively process or forward the input data to the switching device depending on the determination. For example, if the ingress engine determines that the received input data does not comprise OAM information, the ingress engine may forward the received input data to the switching device for normal processing, such that the switching device acts as if it directly received the input data. If the ingress engine determines that the input data does comprise OAM information, the ingress engine may intercept the input data and process it at the OAM co-processor. This may cause OAM information to be processed utilizing the latest known OAM technology, rather than the potentially dated OAM processing technology of the switching device.

In some embodiments, an egress engine may be implemented (e.g., in an OAM co-processor), and may receive output data from the switch. The output data may comprise OAM data as well as non-OAM data (e.g., user data). As an example, the output data may comprise Ethernet or MPLS data. The egress engine may determine whether the output data comprises OAM information, and may selectively process the output data or forward the output data to a next hop device depending on the determination. For example, if the egress engine determines that the output data does not comprise OAM data, the egress engine may forward the output data to a next hop device such that the next hop device is unaware of the fact that the egress engine examined the output data. If the egress engine determines that the output data comprises OAM information, the egress engine may intercept the output data and process it at the co-processor. This may cause OAM information to be processed utilizing the latest known OAM technology, rather than potentially dated technology of the switching device.

In some embodiments, the egress engine may manage data traffic congestion based on the OAM information. For example, the egress engine may learn of congestion patterns of the output data and make determinations as to how to alleviate the congestion pattern. In some embodiments, the OAM information itself may cause traffic congestion, and the egress engine may manage the traffic congestion caused by the OAM information. For example, the egress engine may maintain a dedicated queue for each of the output data and the OAM data, and may selectively schedule transmission of the output data and the OAM data.

In some embodiments, the input data and the output data may both operate in accordance with varying routing and/or switching protocols such as Ethernet, MPLS Transport Profile (MPLS-TP), Transport MPLS (T-MPLS), IP/MPLS, and the like.

In some embodiments, the ingress engine may monitor the input data and gather statistics about the input data, such that processing of the input data may be performed based on the gathered statistics. The statistics, for example, may comprise information regarding the states of queues, the amount of input data sent, the amount of input data received, the amount of input data discarded, delays or delay variations, and/or information regarding a port, flow, class of service, or color of data.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION

Operation, Administration, and Management (OAM) is an extensive framework that is generally utilized for fault monitoring and performance monitoring in telecommunications networks. OAM in packet-switching networks may be performed by exchanging OAM frames (e.g., Programmable Data Units (PDUs)) between pairs of OAM end-points. OAM networks may rely on extensive and complex functionality. For example, OAM may be implemented in multiple variants and protocols, such as Ethernet OAM, MPLS-TP OAM, T-MPLS OAM, Proprietary OAM implementations, IP/MPLS OAM, and the like. An OAM framework may be utilized to exchange the status of local or remote defects and/or events. An OAM framework may also be used to measure frame loss metrics, measure frame delay or delay variation metrics, and the like.

OAM presents challenges in network and system architecture design. For example, OAM systems may generate up to tens of millions of OAM PDUs per second to process, thereby causing traffic congestion. Systems utilizing OAM may also require the use of jumbo frames to accommodate OAM, and may need to handle one hundred gigabits per second or more of OAM processing throughput. Furthermore, OAM related standards are often subject to rapid change. Finally, OAM systems may require flexibility, as users may require various non-standard features, such as faster exchange PDU rates.

Figure 1:
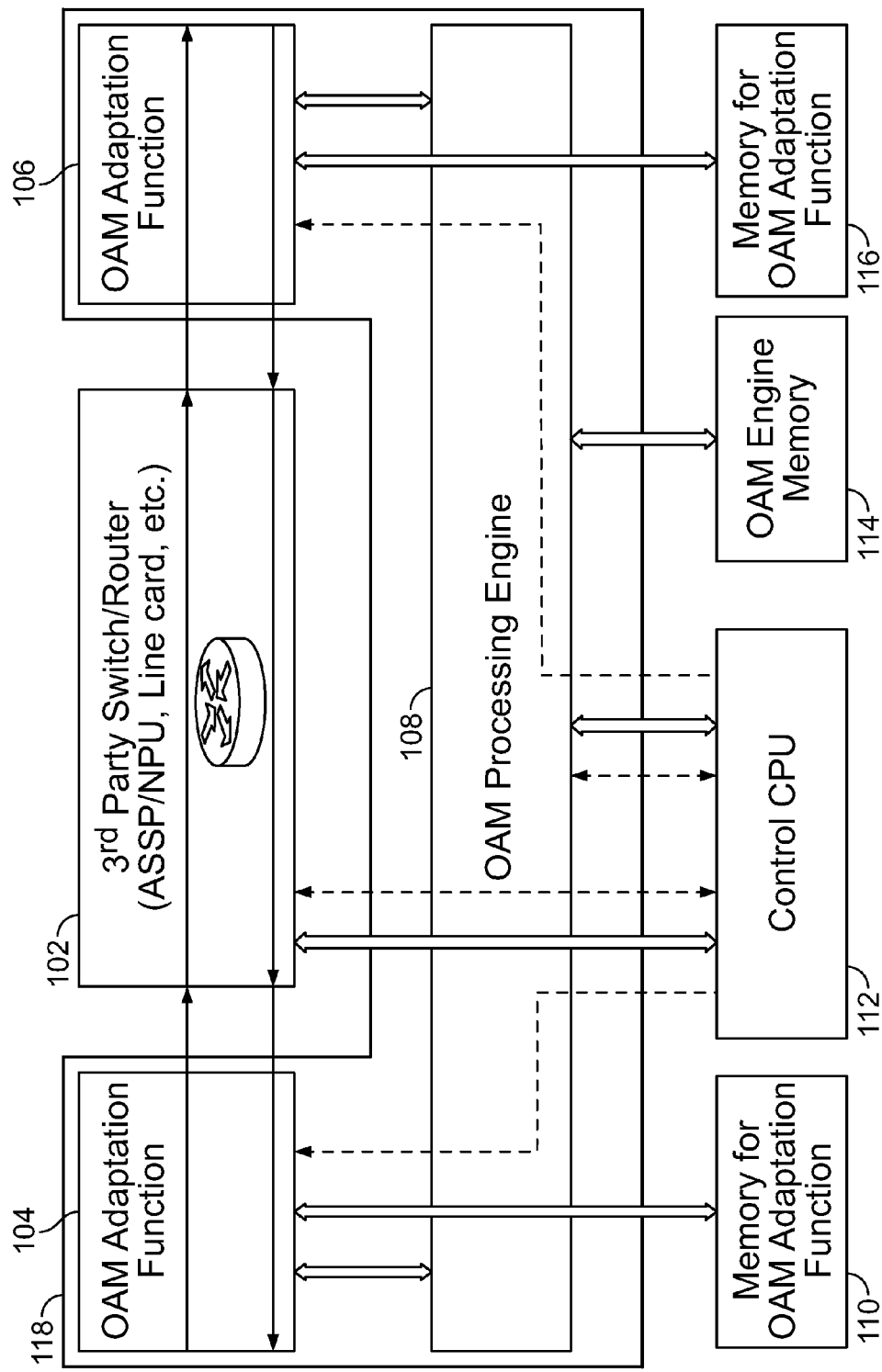
FIG. 1 depicts the architecture of an exemplary system implementing an OAM co-processor that is connected to a switching device, in accordance with some embodiments of this disclosure.

FIG. 1 depicts the architecture of an exemplary system implementing an OAM co-processor that is connected to a switching device, in accordance with some embodiments of this disclosure. Switch 102 is designated as a switch, but may be any known switching device, routing device, ASSP, NPU, line card, or any other device that causes data to be transmitted or forwarded. Switch 102 may contain OAM processing capabilities and/or OAM processing circuitry; however, such circuitry may not reflect the state of the art of OAM processing technology, and may not be reprogrammable to cause it to reflect the state of the art. Accordingly, OAM co-processor 118 may be connected to switch 102.

OAM co-processor 118 may be connected to switch 102 in any known manner. For example, OAM co-processor 118 may be installed on the same circuit board with switch 102. As another example, OAM co-processor 118 may be installed on a separate circuit board from OAM co-processor 102 and connected, e.g., by being installed on a same chassis. OAM co-processor 118 may provide functionality to assist the processing of switches such as Ethernet, MPLS, and IP routers and switches. Such functionality may include Ethernet OAM, MPLS-TP OAM, T-MPLS OAM, Proprietary OAM implementations, IP/MPLS OAM, and the like. OAM co-processor 118 may be implemented on, e.g., an integrated circuit (IC), such as a programmable logic device (PLD) (e.g., a field programmable gate array (FPGA)), etc.

OAM co-processor 118 is depicted as effectively "wrapping" ports and interfaces of switch 102. In some embodiments, the consequence of this "wrapping" is that OAM co-processor 118 intercepts all incoming and outgoing traffic to and from switch 102; however, this disclosure also contemplates OAM co-processor 118 selectively intercepting some or none of the incoming and outgoing traffic to and from switch 102. OAM co-processor may include OAM Adaptation Functions (e.g., OAM Adaptation Functions 104 and 106), Protection Adaptation Functions (e.g., OAM Protection Adaptation Function 314) and an OAM Processing Engine (e.g., OAM Processing Engine 108). While as depicted, OAM co-processor 118 includes OAM Adaptation Function 104, OAM Adaptation Function 106, and OAM Processing Engine 108, OAM co-processor 118 may optionally include more blocks or fewer blocks, such as Memory for OAM Adaptation Function 110, Control Central Processing Unit (CPU) 112, OAM Engine Memory 114, and Memory for OAM Adaptation Function 116, as well as any other block. Alternatively, any or all of Memory for OAM Adaptation Function 110, Control CPU 112, OAM Engine Memory 114, and Memory for OAM Adaptation Function 116 may be implemented externally to OAM co-processor 118, as depicted in FIG. 1. Any item of FIG. 1, whether depicted or not depicted, may be combined with one or more of any other item of FIG. 1. OAM Processing Engine 108 may utilize internal or external memory, such as OAM Engine memory 114. The memory may be dedicated to OAM Processing Engine 108 or shared with other functions.

OAM Processing Engine 108 may provide OAM functionality including the automatic generation of OAM PDUs, and transmission of the OAM PDUs to other devices or blocks (e.g., OAM peers). OAM Processing Engine 108 may insert or process various fields based on customer configuration (e.g., Type-Length-Value (TLV) fields). OAM Processing Engine 108 may use various PDU sizes based on customer configuration as well.

OAM Processing Engine 108 may provide OAM functionality for the processing of received OAM PDUs. Processing may include validating OAM PDUs and the automatic detection of missing OAM PDUs received from OAM peers. Processing may also include calculating and storing delay or delay variation statistics, or a frame loss ratio for one or more OAM sessions.

Processing of received OAM PDUs performed by OAM Processing Engine 108 may also include detecting and raising defects, alarms, or events for OAM sessions. For example, OAM Processing Engine 108 may detect and raise a loss of connectivity. As another example, OAM Processing Engine 108 may determine that a frame loss measurement during a monitored period of time has crossed a predetermined threshold.

OAM Processing Engine 108 may also process received OAM PDUs by detecting and notifying the system about changes in different OAM statuses carried by OAM PDUs. As an example, OAM Processing Engine may detect a change in a port status TLV, or may detect a change in an interface status TLV, and report it to the system. As another example, OAM Processing Engine 108 may detect a change in a Remote Defect Indication (RDI) indication and notify the system.

OAM Processing Engine 108 may also process received OAM PDUs by forwarding some or all OAM PDUs toward Control CPU 112 for additional processing, such as software processing, e.g., based on an OAM PDU type. Similarly, OAM Processing Engine 108 may forward OAM PDUs that are generated by Control CPU 112 (e.g., using software-based processing) towards OAM Adaptation Function 104 or OAM Adaptation Function 106.

OAM Adaptation Functions 104 and 106 may operate in one manner when processing ingress traffic, as will be described with respect to FIG. 2, and may operate in another manner when processing egress traffic, as will be described with respect to FIG. 3. OAM Adaptation Functions 104 and 106 may utilize dedicated memory such as memory 110 and memory 116, or may utilized memory that is shared with other functions.

Figure 2:
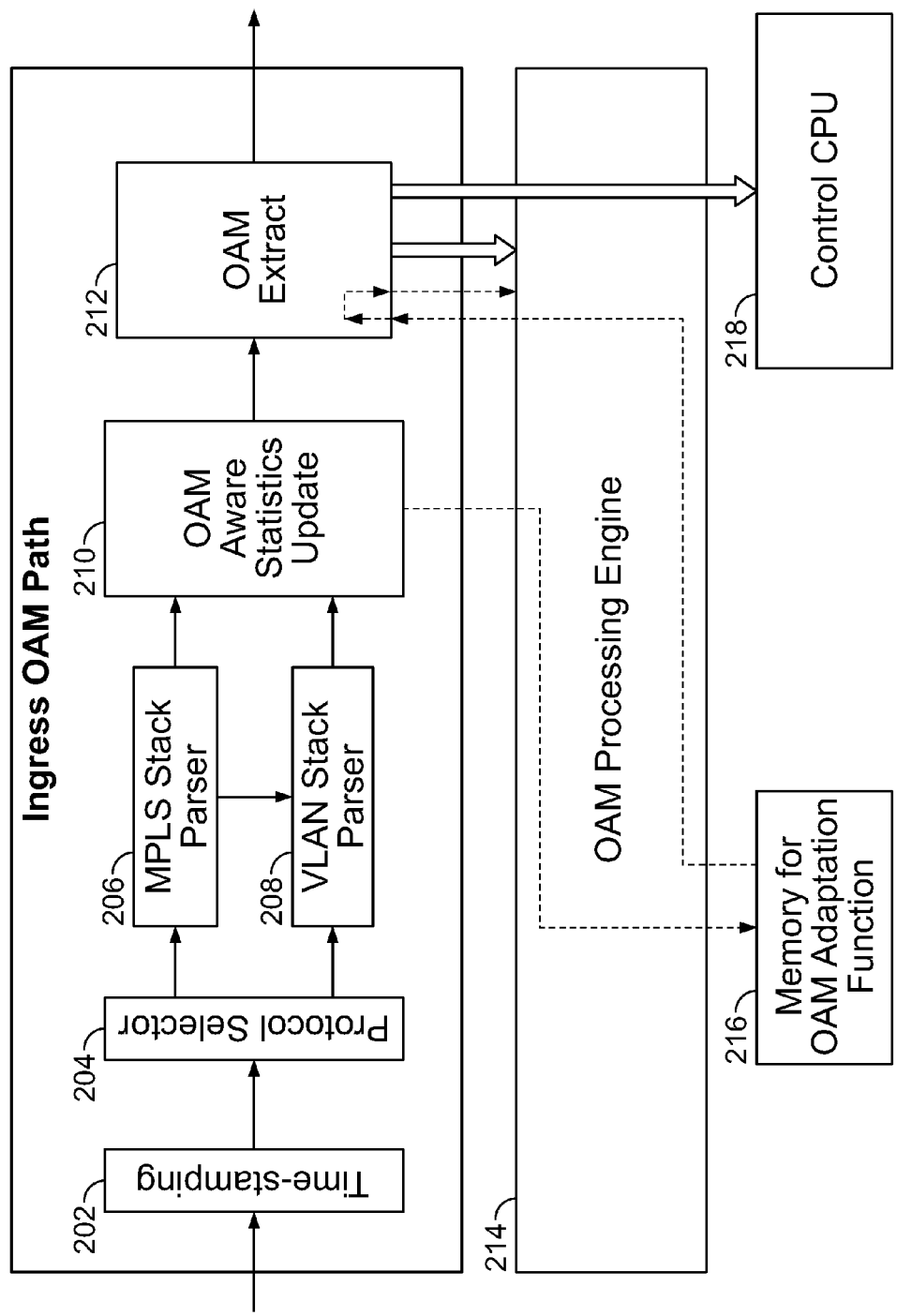
FIG. 2 depicts the architecture of an exemplary OAM Adaptation Function on the ingress side of an OAM co-processor, in accordance with some embodiments of this disclosure.

FIG. 2 depicts the architecture of an exemplary OAM Adaptation Function on the ingress side of an OAM co-processor, in accordance with some embodiments of this disclosure. FIG. 2 may depict an exemplary embodiment of an ingress OAM path of OAM Adaptation Function 104 or OAM Adaptation Function 106. The ingress OAM path may time-stamp the arriving OAM frames, and transparently forward the non-OAM traffic to a switch (e.g., switch 102) such that switch 102 acts as if OAM co-processor 118 did not intercept the non-OAM traffic. The ingress path may additionally monitor forwarded user data, and gather and maintain OAM related statistics based on the monitoring. Furthermore, OAM Adaptation Functions 106 may, in the ingress path, intercept and extract OAM frames relevant for monitored OAM entities from the ingress traffic, and may match the intercepted OAM frames with monitored statistics, such that it may provide the information about matched statistic entries to an OAM processing function (e.g., OAM processing function 214).

Time Stamping Block 202 may time-stamp arriving OAM data, and may refrain from time-stamping non-OAM traffic. Time Stamping Block 202 may refrain from time-stamping non-OAM traffic in order to transparently forward the non-OAM traffic to a switch (e.g., switch 102) such that switch 102 acts as if OAM co-processor 118 did not intercept the non-OAM traffic, or may time-stamp non-OAM traffic. Time-stamped data may be utilized to measure delay and delay variation. The time-stamps may be stored by time-stamping block 202 internally or externally (e.g., in memory 216). Stored time-stamp data may be discarded for non-OAM traffic. Time-stamp data may be utilized with delay measurement related PDUs, such as Delay Measurement Message (DMM), Delay Measurement response (DMR), One-way Delay Measurement (1DM), and the like.

Protocol selector 204 may be utilized such that adaptation function 104 or 106 may perform appropriate action depending on a type of traffic. For example, protocol selector may determine whether incoming data traffic is of an MPLS type or of an Ethernet type. If the incoming data traffic is of an MPLS type, the data traffic may be forwarded to MPLS Stack Parser 206. If the incoming data traffic is of an Ethernet type, the data traffic may be forwarded to Virtual Local Area Network (VLAN) Stack Parser 208. While only MPLS and VLAN types are depicted in FIG. 2 and discussed in this disclosure, protocol selector may select from any known protocol, and a parser may be implemented for any known protocol in any manner consistent with this disclosure.

MPLS Stack Parser 206 may parse MPLS traffic, such as MPLS-TP data flows, T-MPLS data flows, and the like. When processing MPLS-TP traffic, MPLS Stack Parser 206 may parse the MPLS stack of the received frame. MPLS Stack Parser 206 may then associate the received frame with the relevant MPLS flow, such as a port or a flow index. MPLS Stack Parser 206 may then map the information of a frame header of an MPLS-TP frame into a relevant class of service or color. MPLS Stack Parser 206 may then analyze the frame to determine whether the frame comprises user data or an OAM PDU, and may forward the processed frame along with the determined information, and, optionally, a Maintenance Entity Point (MEG) End Point Identifier (MEP ID) or MEG Intermediate Point (MIP ID) or the like, to a next step (e.g., VLAN Stack Parser 208 or OAM-aware statistics update 210).

If the frame is determined to comprise an OAM PDU, the frame may be marked as an OAM PDU to indicate to the OAM Adaptation Function (e.g., OAM Adaptation Function 104) that it is to be extracted from the data flow and forwarded to an OAM Processing Engine (e.g., OAM Processing Engine 214) for further OAM processing. The frame may be recognized as an OAM PDU if, for example, MPLS Stack Parser 206 interacts with the incoming OAM message by means of OAM maintenance points (e.g., Up/Down MEPs, MIPs, Time To Live (TTL), router alert labels, etc.). OAM maintenance points, such as those described in the foregoing, are described more fully in ITU G.8113.1, G.8113.2, and G.8114.

VLAN Stack Parser 208 may parse Ethernet traffic (e.g., 802.1Q single-tagged or double-tagged traffic) and the like. VLAN Stack Parser 208 may parse the VLAN stack of a received frame, and then associate the received frame with a relevant MPLS flow (e.g., port or flow index). VLAN Stack Parser 208 may also map information in frame headers to a relevant class of service or color.

VLAN Stack Parser 208 may analyze a received frame to determine whether the frame comprises user data or an OAM PDU, and may forward the frame along with the determined information, and, optionally, an MEP IP or MIP ID or the like, to a next step (e.g., OAM-aware statistics update 210). The frame may be recognized as an OAM PDU if, for example, VLAN Stack Parser 208 interacts with the incoming OAM message by means of OAM maintenance points (e.g., Up/Down MEPs, MIPs, TTL, router alert labels, etc.). OAM Maintenance points, such as those described in the foregoing, are described more fully in ITU G.8113.1, G.8113.2, and G.8114.

VLAN Stack Parser 208 may analyze a received frame to determine whether the frame comprises user data or an OAM PDU, and may forward the frame along with the determined information, and, optionally, an MEP IP or MIP ID or the like, to a next step (e.g., OAM-aware statistics update 210). The frame may be recognized as an OAM PDU if, for example, VLAN Stack Parser 208 interacts with the incoming OAM message by means of OAM maintenance points (e.g., Up/Down MEPs, MIPs, TTL, router alert labels, etc.). OAM Maintenance points, such as those described in the foregoing, are described more fully in ITU G.8113.1, G.8113.2, and G.8114.

OAM-aware Statistics Update Function 210 (also referred to as "Statistics Update Function 210") may be utilized for monitoring, gathering, and storing statistics for user data flows. Statistics Update Function 210 may also be responsible for associating OAM PDU frames with a snapshot of relevant entries in, e.g., stored statistics records or tables. Statistics Update Function 210 may receive the original frame together with an indication of, e.g., traffic type, as well as one or more of port, flow index, class of service, color, and whether the data is user or OAM data. The information about the traffic type (e.g., MPLS-TP, T-MPLS, Ethernet, etc) may be provided by protocol selector function 204, encoded into a flow index, or associated to a port by a prior configuration.

With respect to user data frames, Statistics Update Function 210 may monitor the status of queues associated with the port, flow, class of service, color, and the like of the user data frames. Statistics Update Function 210 may then store the statistics in a memory (e.g., Memory for OAM Adaptation Function 216). The memory may be internal or external to an OAM co-processor (e.g., OAM co-processor 118), and may be either dedicated to the Statistics Update Function 210, or shared with other functions (e.g., OAM Processing Engine 214).

With respect to OAM PDUs, Statistics Update Function 210 may create a snapshot of a statistics entry accessed with either a port, flow, class of service, or color of a processed OAM frame. Statistics Update Function 210 may then forward the snapshot, either directly or by using an index to the snapshot data, to OAM extract module 212.

OAM extract module 212 may be utilized for extraction of OAM PDUs from the data, and for the forwarding of the OAM PDUs to a processing module (e.g., OAM Processing Engine 214) or to Control CPU 218. The OAM extract module shall generally not affect non-OAM data frames, such as user data frames.

OAM Extract module 212 may receive a frame with accompanying information about, e.g., whether the frame contains user data or OAM data, a time stamp, and a snapshot of the port, flow, class of service, and/or color entry in a flow statistics record (e.g., table) if the data is OAM data. The accompanying information may appear in a header. OAM extract module may forward user data to the egress port, and extract OAM PDUs and forward the OAM PDUs to OAM Processing Engine 214 together with the accompanying information, as well as optionally an MEP ID or MIP ID. OAM Extract module 212 may optionally analyze the OAM type of an OAM PDU and forward OAM PDUs to Control CPU 218, either for all OAM types, or for preconfigured OAM types, such as LoopBack Message (LBM), LoopBack Reply (LBR), LinkTrace Message (LTM), LinkTrace Reply (LTR), Experimental messages (EXP), Vander Specific PDU (VSP), and the like.

Figure 3:
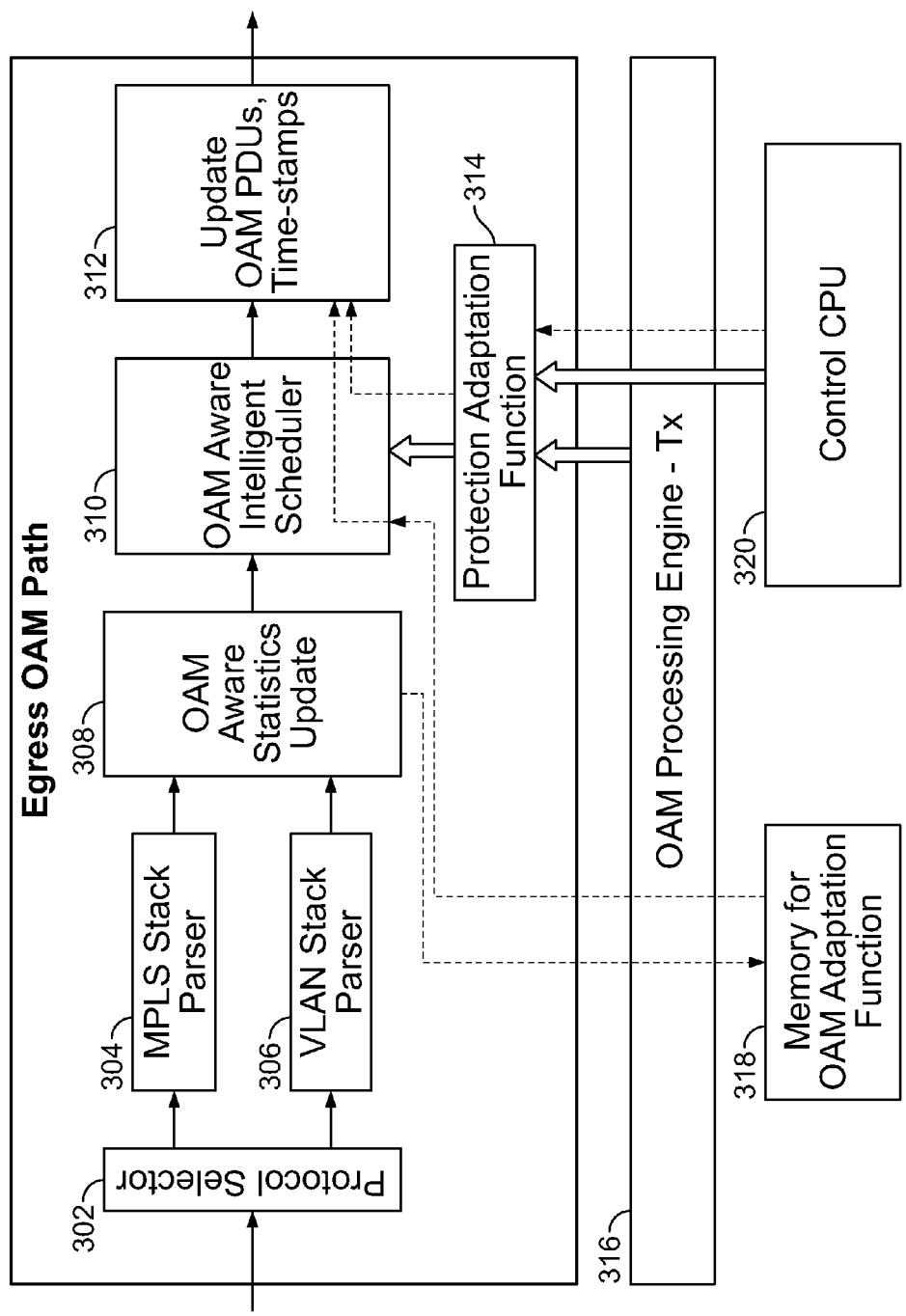
FIG. 3 depicts the architecture of an exemplary OAM Adaptation Function on the egress side of an OAM co-processor, in accordance with some embodiments of this disclosure.

FIG. 3 depicts the architecture of an exemplary OAM Adaptation Function on the egress side of an OAM co-processor, in accordance with some embodiments of this disclosure. The OAM Adaptation Function on the egress side of an OAM co-processor (e.g., OAM Adaptation Function 106) may transparently forward non-OAM traffic (e.g., user data) to a next hop device. OAM Adaptation Function 106 may additionally monitor forwarded user data in order to gather and maintain OAM related statistics of the user data. In some embodiments, OAM Adaptation Function may receive OAM frames from an OAM engine (e.g., OAM Processing Engine 316) or from a Control CPU through (e.g., Control CPU 320), optionally through a Protection Adaptation Function (e.g., Protection Adaptation Function 314).

OAM Adaptation Function 106 may inject received OAM frames into user flows. For example, OAM Adaptation Function may use intelligent scheduling or buffering to emulate a traffic management function on the egress side. OAM Adaptation Function 106 may match received OAM frames with monitored statistics, and may update injected OAM frames with information such as time stamps, matched statistic entries, updated headers to reflect the status of protection entities (e.g., VLANs for Active path with linear protection, MPLS labels for Active path, MPLS labels for FRR detours, etc), and updated checksums for Ethernet/MPLS headers).

Protocol selector 302 of the egress path may act in accordance with the functionality as described in the foregoing with respect to protocol selector 204 of the ingress path.

MPLS Stack Parser 304 of the egress path may act in accordance with the functionality described in the foregoing with respect to MPLS Stack Parser 206 of the ingress path. Typically, in the egress path, OAM frames will be injected by Control CPU 320 or OAM Processing Engine 316, so an indication that the data is user data and not OAM data will typically be set in the egress path.

VLAN Stack Parser 306 of the egress path may act in accordance with the functionality described in the foregoing with respect to VLAN Stack Parser 208 of the ingress path. Typically, in the egress path, OAM frames will be injected by Control CPU 320 or OAM Processing Engine 316, so an indication that the data is user data and not OAM data will typically be set in the egress path.

OAM-aware statistics update 308 (also referred to as "Statistics Update Function 308") may be responsible for monitoring, gathering, and storing statistics for user flows. Statistics Update Function 308 may receive an original frame together with an indication about a traffic type and, e.g., information about port, flow index, class of service, color, and the like. The information about the traffic type (e.g., MPLS-TP, T-MPLS, and Ethernet protocols) may be provided by protocol selector 302, encoded into a flow index, or associated with a port by prior configuration.

Statistics Update Function 308 may, for user data frames, monitor the status of queues associated with, e.g., a port, flow, class of service, or color. Statistics Update Function 308 may do so by counting a number of corresponding received frames, discarded frames, etc. Statistics Update Function 308 may then store the statistics into a memory. The memory may be internal or external to an OAM co-processor (e.g., OAM co-processor 118), and may be either dedicated to the Statistics Update Function 308, or shared with other functions (e.g., OAM Processing Engine 316).

OAM-aware Intelligent Scheduler 310 (also referred to as "Intelligent Scheduler 310" may manage traffic flow from an egress adaptation function (e.g., adaptation function 106). Congestion of individual user flows, or with a whole port, may occur since traffic generated by OAM Processing Engine 316 is significant. Intelligent Scheduler 310 is responsible for outputting both user traffic frames as well as OAM frames generated by OAM Processing Engine 316 and/or Control CPU 320, and for mitigating possible issues created by congestions. In order to achieve optimal scheduling, user data and OAM PDUs may be stored in dedicated queues associated with relevant data flows and classes of service.

OAM-aware Intelligent Scheduler 310 may queue user data and OAM PDUs before forwarding them to an egress port. The user data and OAM PDUs may be queued according to, e.g., port, flow, class of service, color, and the like. Intelligent Scheduler 310 may monitor the status of the queues and discard received user data and/or OAM PDUs according to a congestion avoidance policy implemented by Intelligent Scheduler 310. Intelligent Scheduler 310 may schedule transmission of the queued data toward update OAM module 312. OAM scheduler 310 may create a snapshot of a statistic entry accessed with, e.g., a port, flow, class of service, color, etc. when a related OAM frame is scheduled for transmission, and may forward the snapshot of the statistics to update OAM module 312 (e.g., either directly, by using an index to the snapshot data, or the like).

A congestion avoidance policy may be built using any known congestion avoidance mechanism, such as RED, WRED, and the like. Additionally, Intelligent Scheduler 310 may store OAM frames in dedicated queues. Intelligent Scheduler 310 may forward in a manner that treats user data and OAM frames differently. For example, an OAM-aware WRED mechanism may have a set of queue thresholds for user data that differs from that of OAM traffic, thus allowing, e.g., OAM traffic to be prioritized over user data and vice versa.

Update OAM module 312 may receive frames from Intelligent Scheduler 310 together with an indication of a frame type, classification, and associated statistics entry. Update OAM module 312 may then transparently forward user data to an egress port. Update OAM module 312 may update OAM PDU information by updating headers (e.g., by updating an MPLS label stack or VLAN stack to reflect the status of an Active Path), updating time-stamps for delay or delay variation measurements, include a snapshot of statistics for loss measurements (e.g., sent and received counters), and update checksums in OAM PDU frames.

Protection Adaptation Function 314 is designed to implement solutions for various issues. As an example, both MPLS and Ethernet networks may implement different protection mechanisms that ensure that user data frames arrive despite network problems (e.g., latency, congestion, dropped frames, etc). Such a result is achieved by sending data along different paths that are indicated by different VLANs or further MPLS labels. For example, an MPLS pseudo-wire (PW) with an MPLS label L1 may be carried by a label-switched path (LSP) with MPLS label L10. In order to build in a layer of protection, the same PW may be carried over a backup LSP which uses an MPLS label L11.

OAM processing function 314 may generate OAM frames for the PW with label L1, but may not have information about the status of an active/standby selection mechanism. As a result, additional logic may be required to map and forward the PW with label L1 into either a LSP with label L10 or into an LSP with label L11. The protection mechanism may also forward the OAM traffic on the PW L1 into another physical port. Similarly, an FRR based MPLS protection mechanism may require pushing an additional MPLS label L20 for a bypass tunnel on top of an MPLS Stack of an OAM PDU. This may result in the same OAM message being forward either with two labels (L1 and L10) or with three labels (L1, L10, and L20).

Protection Adaptation Function 312 may address these issues by implementing the functionality. Protection Adaptation Function 312 may receive information from Control CPU 320 about a current status of all protected and unprotected entities. Protection Adaptation Function 312 may then map the traffic generated by OAM Processing Engine 316 into both the active port, and the active transport. The active transport path may be indicated by any of MPLS labels dedicated for active and standby paths, MPLS labels added or removed on/from the top of an MPLS stack, VLANs dedicated for active and standby paths, and the like. Protection Adaptation Function 314 may provide an indication about this mapping to Intelligent Scheduler 310 and to OAM update module 312.

Without any loss of generality, Protection Adaptation Function 312 may be applied for OAM over unprotected paths. In this case, Protection Adaptation Function 314 may be preconfigured by Control CPU 320 with mapping indicates for, e.g., active paths only.

Figure 4:
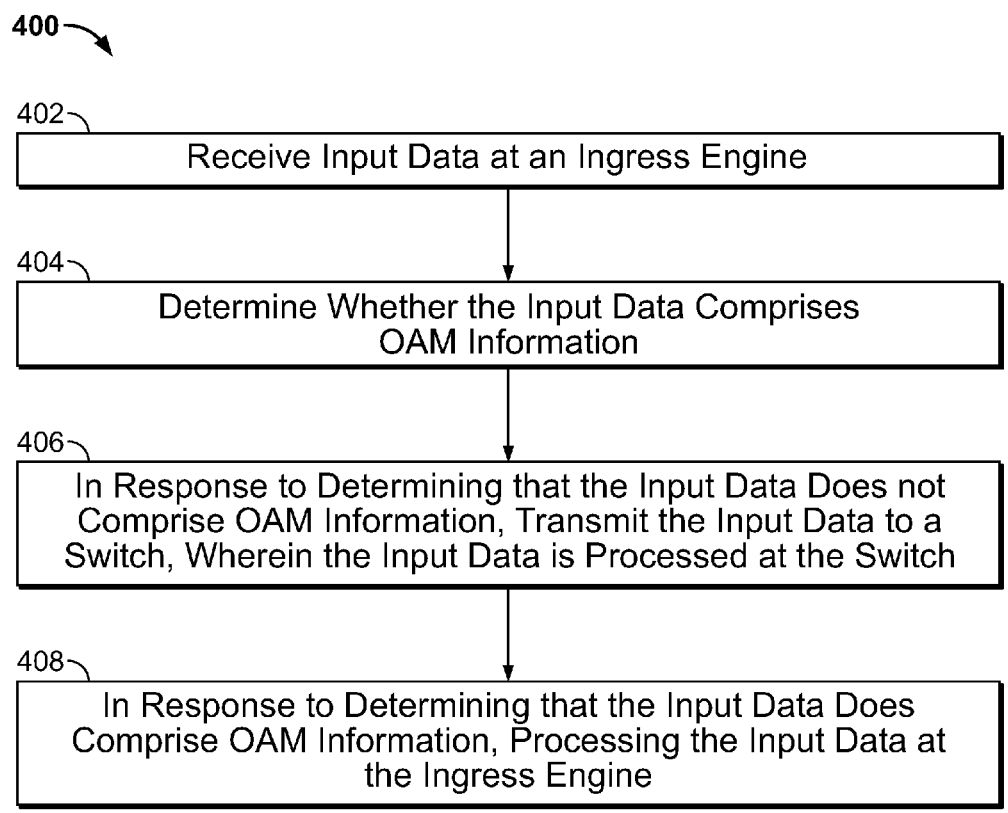
FIG. 4 depicts a flow chart for implementing an exemplary OAM co-processor that is connected to a switch, in accordance with some embodiments of this disclosure.

FIG. 4 depicts a flow chart for implementing an exemplary OAM co-processor that is connected to a switch, in accordance with some embodiments of this disclosure. At 402, an OAM co-processor (e.g., OAM co-processor 118) may receive input data at an ingress engine (e.g., OAM Adaptation Function 104). At 404, the OAM co-processor may determine whether the input data comprises OAM information. At 406, the OAM co-processor may transmit the input data to a switch (e.g., switch 102) in response to determining that the input data does not comprise OAM information. At 408, the OAM co-processor may process the input data at the ingress engine.

Figure 5:
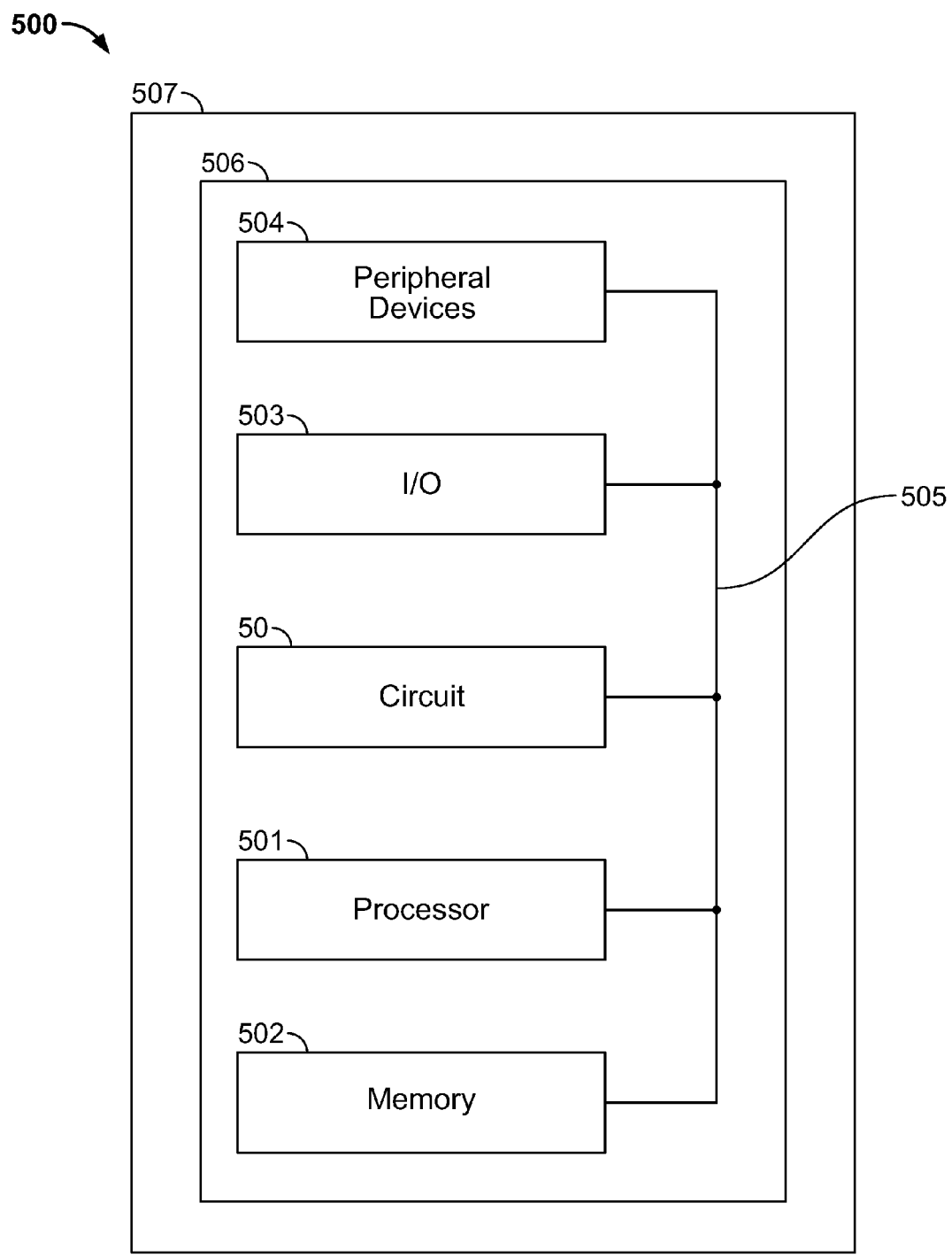
FIG. 5 depicts a simplified block diagram of an exemplary system employing a programmable logic device incorporating the present invention.

As depicted in FIG. 5, an Integrated Circuit Programmable Logic Device (PLD) 500 incorporating configurable specialized processing blocks making use of the multiple network planes according to the present disclosure may be used in many kinds of electronic devices. Integrated Circuit Programmable Logic Device 500 may be an integrated circuit, a processing block, application specific standard product (ASSP), application specific integrated circuit (ASIC), programmable logic device (PLD), full-custom chip, or a dedicated chip, however, for simplicity, it may be referred to as PLD 500 herein. One possible use is in an exemplary data processing system 500 shown in FIG. 10. Data processing system 500 may include one or more of the following components: a processor 501; memory 502; I/O circuitry 503; and peripheral devices 504. These components are coupled together by a system bus 505 and are populated on a circuit board 506 which is contained in an end-user system 507.

System 500 can be used in a wide variety of applications, such as computer networking, data networking, instrumentation, video processing, digital signal processing, or any other application where the advantage of using programmable or reprogrammable logic is desirable. PLD 500 can be used to perform a variety of different logic functions. For example, PLD 500 can be configured as a processor or controller that works in cooperation with processor 501. PLD 500 may also be used as an arbiter for arbitrating access to a shared resources in system 500. In yet another example, PLD 500 can be configured as an interface between processor 501 and one of the other components in system 500. It should be noted that system 500 is only exemplary, and that the true scope and spirit of the invention should be indicated by the following claims.

Various technologies can be used to implement PLDs 500 as described above and incorporating this disclosure.

Figure 6:
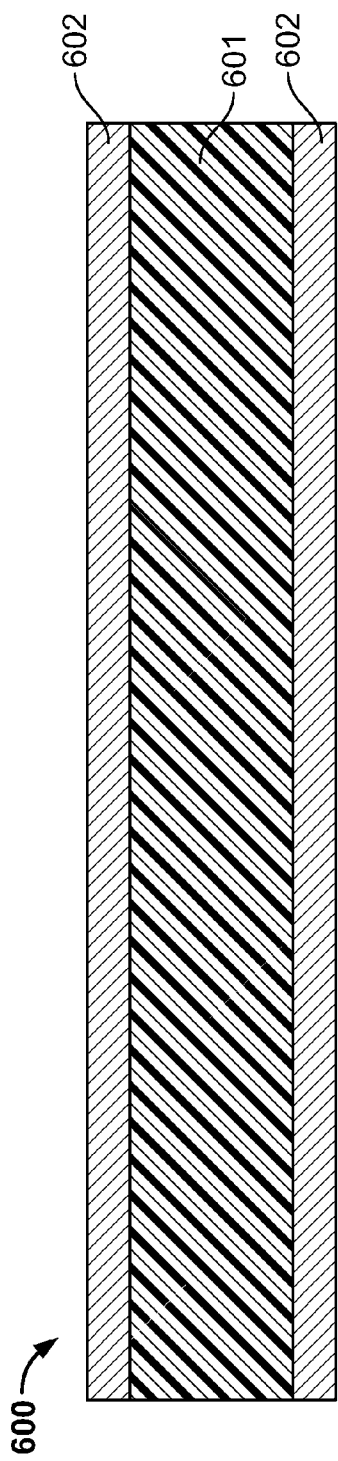
FIG. 6 is a cross-sectional view of a magnetic data storage medium encoded with a set of machine-executable instructions for performing the method according to the present invention.

FIG. 6 presents a cross section of a magnetic data storage medium 600 which can be encoded with a machine executable program that can be carried out by systems such as a workstation or personal computer, or other computer or similar device. Medium 600 can be a floppy diskette or hard disk, or magnetic tape, having a suitable substrate 601, which may be conventional, and a suitable coating 602, which may be conventional, on one or both sides, containing magnetic domains (not visible) whose polarity or orientation can be altered magnetically. Except in the case where it is magnetic tape, medium 600 may also have an opening (not shown) for receiving the spindle of a disk drive or other data storage device.

The magnetic domains of coating 602 of medium 600 are polarized or oriented so as to encode, in manner which may be conventional, a machine-executable program, for execution by a programming system such as a workstation or personal computer or other computer or similar system, having a socket or peripheral attachment into which the PLD to be programmed may be inserted, to configure appropriate portions of the PLD, including its specialized processing blocks, if any, in accordance with the invention.

Figure 7:
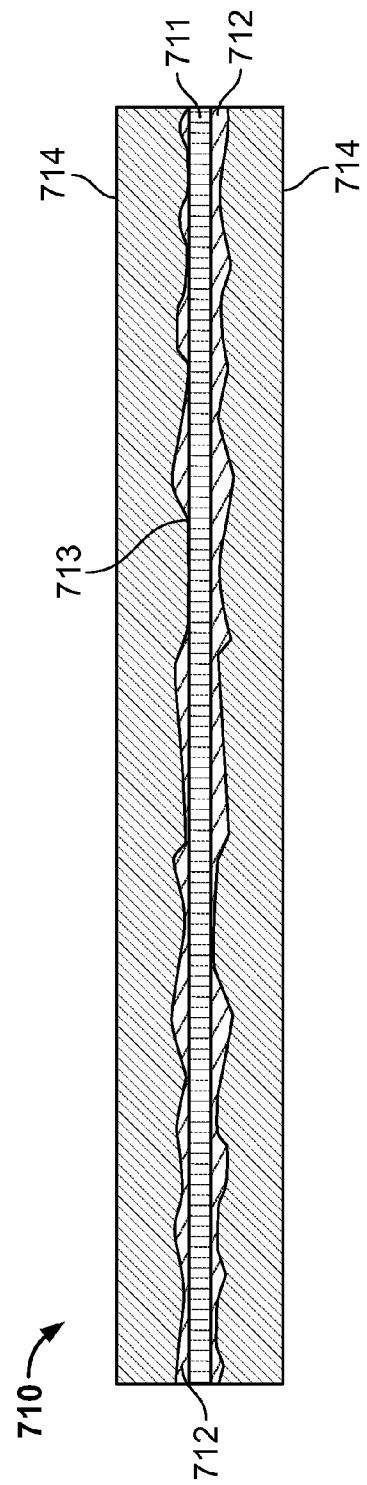
FIG. 7 is a cross-sectional view of an optically readable data storage medium encoded with a set of machine executable instructions for performing the method according to the present invention.

FIG. 7 shows a cross section of an optically-readable data storage medium 710 which also can be encoded with such a machine-executable program, which can be carried out by systems such as the aforementioned workstation or personal computer, or other computer or similar device. Medium 710 can be a conventional compact disk read-only memory (CD-ROM) or digital video disk read-only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 710 preferably has a suitable substrate 711, which may be conventional, and a suitable coating 712, which may be conventional, usually on one or both sides of substrate 711.

In the case of a CD-based or DVD-based medium, as is well known, coating 712 is reflective and is impressed with a plurality of pits 713, arranged on one or more layers, to encode the machine-executable program. The arrangement of pits is read by reflecting laser light off the surface of coating 712. A protective coating 714, which preferably is substantially transparent, is provided on top of coating 712.

In the case of magneto-optical disk, as is well known, coating 712 has no pits 713, but has a plurality of magnetic domains whose polarity or orientation can be changed magnetically when heated above a certain temperature, as by a laser (not shown). The orientation of the domains can be read by measuring the polarization of laser light reflected from coating 712. The arrangement of the domains encodes the program as described above.

It will be understood that the foregoing is only illustrative of the principles of the disclosure, and that various modifications can be made by those skilled in the art without departing from the scope and spirit of the disclosure. For example, the various elements of this disclosure can be provided on a PLD in any desired number and/or arrangement. One skilled in the art will appreciate that the present disclosure can be practiced by other than the described embodiments, which are presented for purposes of illustration and not of limitation, and the present invention is limited only by the claims that follow.

What is claimed is:

1. A method for implementing an Operation, Administration, and Management (OAM) co-processor that is connected to a switch, the method comprising:
   receiving input data at an ingress engine;
   determining whether the input data comprises OAM information;
   in response to determining that the input data does not comprise OAM information, transmitting the input data to the switch, wherein the input data is processed at the switch; and
   in response to determining that the input data does comprise OAM information, processing the input data at the ingress engine;
   receiving output data at an egress engine from the switch;
   determining whether the output data comprises OAM information;
   in response to determining that the output data does not comprise OAM information, forwarding the output data to a next hop;
   in response to determining that the output data does comprise OAM information, processing the output data at the egress engine;
   maintaining a first queue for a first plurality of output data including the output data, wherein the first plurality of output data is associated with a first traffic control parameter, and wherein the first plurality of output data comprises both OAM data and non-OAM data;
   maintaining a second queue for a second plurality of output data including the output data, wherein the second plurality of output data is associated with a second traffic control parameter, and wherein the second plurality of output data comprises both OAM data and non-OAM data; and
   selectively scheduling transmission of data in the first queue and the second queue based on the first traffic control parameter and the second traffic control parameter.

2. The method of claim 1, wherein the step of processing the output data at the egress engine comprises managing data traffic congestion based on the OAM information.

3. The method of claim 1, wherein the input data and output data both operate in accordance with at least one of the following protocols: Ethernet, MPLS, MPLS-TP, T-MPLS, and IP/MPLS.

4. The method of claim 1, further comprising:
   monitoring the input data at the ingress engine; and
   gathering statistics about the input data learned while monitoring the input data, wherein the processing of the input data at the ingress engine is performed based on the gathered statistics.

5. The method of claim 4, wherein the statistics comprise at least one of the states of the queues, the amount of input data sent, the amount of input data received, the amount of input data discarded, and a port, flow, class of service, and/or color of data.

6. A system for implementing an Operation, Administration, and Management (OAM) co-processor that is connected to a switch, the system comprising:
   an ingress engine that:
      receives input data;
      determines whether the input data comprises OAM information;
      in response to determining that the input data does not comprise OAM information, transmits the input data to the switch, wherein the input data is processed at the switch; and
      in response to determining that the input data does comprise OAM information, processes the input data; and
   an egress engine that:
      receives output data from the switch;
      determines whether the output data comprises OAM information;
      in response to determining that the output data does not comprise OAM information, forwards the output data to a next hop;
      in response to determining that the output data does comprise OAM information, processes the output data;
      maintains a first queue for a first plurality of output data including the output data, wherein the first plurality of output data is associated with a first traffic control parameter, and wherein the first plurality of output data comprises both OAM data and non-OAM data;
      maintains a second queue for a second plurality of output data including the output data, wherein the second plurality of output data is associated with a second traffic control parameter, and wherein the second plurality of output data comprises both OAM data and non-OAM data; and
      selectively schedules transmission of data in the first queue and the second queue based on the first traffic control parameter and the second traffic control parameter.

7. The system of claim 6, wherein the egress engine, when processing the output data, manages data traffic congestion based on the OAM information.

8. The system of claim 6, wherein the input data and output data both operate in accordance with at least one of the following protocols: Ethernet, MPLS, MPLS-TP, T-MPLS, and IP/MPLS.

9. The system of claim 6, wherein the ingress engine further:
   monitors the input data; and
   gathers statistics about the input data learned while monitoring the input data, wherein the processing of the input data is performed based on the gathered statistics.

10. The system of claim 9, wherein the statistics comprise at least one of the states of the queues, the amount of input data sent, the amount of input data received, the amount of input data discarded, and a port, flow, class of service, and/or color of data.

11. A non-transitory machine-readable medium comprising instructions thereon for configuring a programmable integrated circuit device as an Operation, Administration, and Management (OAM) co-processor for connection to a switch, the instructions comprising:
   instructions to configure logic of the programmable integrated circuit device to receive input data at an ingress engine;

instructions to configure the logic of the programmable integrated circuit device to determine whether the input data comprises OAM information;

instructions to configure the logic of the programmable integrated circuit device to, in response to determining that the input data does not comprise OAM information, transmit the input data to the switch, wherein the input data is processed at the switch; and instructions to configure the logic of the programmable integrated circuit device to, in response to determining that the input data does comprise OAM information, process the input data at the ingress engine;

instructions to configure the logic of the programmable integrated circuit device to maintain a first queue for a first plurality of output data including the output data, wherein the first plurality of output data is associated with a first traffic control parameter, and wherein the first plurality of output data comprises both OAM data and non-OAM data;

instructions to configure the logic of the programmable integrated circuit device to maintain a second queue for a second plurality of output data including the output data, wherein the second plurality of output data is associated with a second traffic control parameter, and wherein the second plurality of output data comprises both OAM data and non-OAM data; and instructions to configure the logic of the programmable integrated circuit device to selectively schedule transmission of data in the first queue and the second queue based on the first traffic control parameter and the second traffic control parameter.

12. The machine-readable medium of claim 11, wherein the instructions to configure the logic of the programmable integrated circuit device to process the output data at the egress engine comprises instructions to manage data traffic congestion based on the OAM information.

13. The machine-readable medium of claim 11, the instructions further comprising:

instructions to configure the logic of the programmable integrated circuit device to maintain a first dedicated queue for a plurality of output data including the output data;

instructions to configure the logic of the programmable integrated circuit device to maintain a second dedicated queue for OAM data, wherein the OAM data is generated in response to the processing of the output data at the egress engine; and instructions to configure the logic of the programmable integrated circuit device to selectively schedule transmission of the output data and the OAM data.

14. The machine-readable medium of claim 11, the instructions further comprising:

instructions to configure the logic of the programmable integrated circuit device to monitor the input data at the ingress engine; and instructions to configure the logic of the programmable integrated circuit device to gather statistics about the input data learned while monitoring the input data, wherein the processing of the input data at the ingress engine is performed based on the gathered statistics.

15. The machine-readable medium of claim 11, wherein the statistics comprise at least one of the states of the queues, the amount of input data sent, the amount of input data received, the amount of input data discarded, and a port, flow, class of service, and/or color of data.

* * * * *